United States Patent [19]
Robinson et al.
[11] 4,200,556
[45] Apr. 29, 1980

[54] REINFORCED RUBBER

[75] Inventors: Joseph G. Robinson, Winchcombe; Lesley D. Herbert, Stroud, both of England

[73] Assignee: Coal Industry (Patents) Limited, London, England

[21] Appl. No.: 905,376

[22] Filed: May 12, 1978

[30] Foreign Application Priority Data

May 27, 1977 [GB] United Kingdom ............... 22462/77

[51] Int. Cl.[2] .......................... C08L 7/00; C08L 9/02; C08L 9/06; C08L 61/34

[52] U.S. Cl. ........................................ 260/3; 525/138; 525/139; 528/163

[58] Field of Search ........................... 260/845, 846, 3; 528/163

[56] References Cited

U.S. PATENT DOCUMENTS

| | | | |
|---|---|---|---|
| 3,674,723 | 7/1972 | Vredenburgh et al. | 260/845 |
| 3,759,848 | 9/1973 | Omran et al. | 528/163 |

FOREIGN PATENT DOCUMENTS

| | | | |
|---|---|---|---|
| 2033015 | 1/1973 | Fed. Rep. of Germany | 528/163 |

*Primary Examiner*—Wilbert J. Briggs, Sr.
*Attorney, Agent, or Firm*—Stevens, Davis, Miller & Mosher

[57] ABSTRACT

A blend of rubber comprising 100 parts of a rubber, from 5 to 150 parts of a carbazole/phenol/formaldehyde resin, from 1 to 5 parts of a vulcanizing agent for the rubber and from 5 to 15 parts per hundred parts of the resin of a formaldehyde donor, is made up. This is done in any usual manner. The blend is then heated, preferably under pressure, to vulcanize the rubber and cross-link the resin. A preferred method of making the resin is described. The invention also comprises reinforced rubbers made according to the process.

7 Claims, No Drawings

REINFORCED RUBBER

This invention relates to reinforced rubber, and particularly relates to rubber reinforced with a carbazole resin.

In compounding either natural or synthetic rubbers it is common practice to incorporate a resin which plasticises the rubber and thereby aids processing. After processing, the rubber compound is heated to a temperature at which both the rubber and the resin are cross-linked, to give a vulcanised reinforced rubber. The vulcanisation is achieved by the cross-linking of the rubber and the reinforcement is achieved by the simultaneous cross-linking of the resin.

It has not been usual to use phenol/formaldehyde resins as plasticising/reinforcing agents for rubbers, since these resins and rubbers are, in general, incompatible. However certain alkyl substituted-phenol/formaldehyde resins are sufficiently compatible with rubbers to be able to be used as plasticising/reinforcing agents.

We have discovered that certain resins derived from carbazole, phenol and formaldehyde can adequately reinforce rubbers, and in some cases the reinforcement achieved is better than that obtained with conventional plasticising/reinforcing resins. It is therefore an aim of the present invention to provide a method of making a reinforced rubber using carbazole/phenol/formaldehyde resins.

According to the present invention there is provided a method of making a reinforced rubber, comprising cross-linking a blend of 100 parts of a rubber, from 5 to 150 parts of a carbazole/phenol/formaldehyde resin, from 1 to 5 parts of a vulcanising agent for the rubber, and from 5 to 15 parts per hundred parts of resin of a formaldehyde donor.

In this specification cross-linking is used to denote both the cross-linking of a rubber by a vulcanising agent and curing of a resin. Also all parts and percentages are by weight unless otherwise indicated, and all Registered Trade Marks are indicated by asterisks.

Preferably the cross-linking is achieved by heating the blend, conveniently at a temperature of from 120° to 180° C., preferably under pressure, conveniently of from about $4\times10^6$ to $80\times10^6$ N/m$^2$, for at least ten minutes.

The rubber may be a styrene/butadiene rubber, a nitrile rubber, natural rubber, or a blend of any two or more of them, although other synthetic rubbers may also be employed.

The carbazole/phenol/formaldehyde resin is preferably made according to the following procedure. A mixture of carbazole, a monocyclic phenol and aqueous formaldehyde is refluxed under alkaline conditions for from 3 to 15 minutes. The mixture is then brought to a pH of from 1 to 2 by the addition of acid, and the acidified mixture is maintained at a pH of from 1 to 2 and a temperature of about 100° C. for from 1 to 5 hours. Unreacted starting materials may then be removed from the resin by any of the usual techniques, for instance distillation or washing.

The carbazole need not necessarily be pure, but it is preferred that it should comprise at least 90% carbazole.

The monocyclic phenol may be phenol itself, or meta-cresol, or a mixture of the two, or any other phenol which is known to be cross-linkable with formaldehyde.

Preferably the first part of the process is carried out in the presence of either sodium or potassium hydroxide to ensure that the mixture is alkaline.

Conveniently the mixture is acidified by the addition of a strong organic acid, which is preferably oxalic acid.

Preferably, the molar ratio of carbazole to phenol is from 1:2 to 1:5, and of carbazole+phenol to formaldehyde is from 2:1 to 1:1.

Conveniently the source of formaldehyde is formalin (a 40% w/v solution of formaldehyde in water).

The vulcanising agent may be a single component, and is usually sulphur although it may also be a peroxide, such as dibenzoyl peroxide, dicumyl peroxide or dilauroyl peroxide. However, in normal commercial practice an accelerator is also added to the vulcanising agent to speed up the cross-linking of the rubber by the vulcanising agent. Most commercially available accelerators may be used, but we prefer to use Ancamine CBS (which is believed to comprise cyclohexyl benzothiazyl sulphenamide), Vulcafor MBTS (which is dibenzthiazyl disulphide), or Vulcafor ZMBT (which is the zinc salt of mercaptobenzthiazole).

The formaldehyde donor, which is present in the blend to cross-link the resin, is preferably Hexamine (hexamethylene tetramine), but it may also be formaldehyde itself or paraformaldehyde.

The blend may further include other compounds, such as carbon black, inert fillers, stabilisers, lubricants and antioxidants. These compounds are generally used in rubber compositions and their use is well known to persons skilled in the art of rubber compounding and formulating.

The rubber blend of the present invention may be processed and moulded in a similar manner to conventional rubber compositions. The moulding conditions, particularly times and temperatures, are not substantially different from those which would be chosen using conventional reinforcing resins.

The blend may be mixed and homogenised by any of the conventional techniques, for instance using a Banbury mixer or a 2-roll mill. Preferably the blending is carried out at a temperature of from 50° to 90° C., at which temperature the resin plasticises the rubber and thereby promotes mixing, but there is no scorching of the rubber.

The present invention also comprises reinforced rubbers when made according to the method of the present invention, and these reinforced rubbers may be used for any of the purposes for which conventional reinforced rubbers are used.

The examples given below are for illustrative purposes only to enable a better understanding of the invention, and are not to be construed as limiting in any way the scope of the invention.

EXAMPLES

Preparation of Carbazole-Phenol-Formaldehyde Resins

Resin 1

116.8 g of carbazole, 197.4 g phenol, 149.4 g of formalin (40% w/v formaldehyde in water), and 2 g of sodium hydroxide in 10 g of water were charged to a flanged flask fitted with a reflux condenser, a thermometer and a stirrer. The flask was heated to about 100° C. in about 15 minutes until the contents thereof were refluxing. The contents were allowed to reflux for about 5 minutes, after which 3.1 g of oxalic acid in 18 g of water was charged to the flask over a period of about 3 minutes. Immediately thereafter, a second charge of 8.8 g of oxalic acid in 50 g of water was added to the flask over a period of about 45 minutes. The flask was then maintained at a temperature of 100° C. for 3.5 hours.

At the end of the reaction period water and some unreacted phenol were distilled off at atmospheric pressure by heating for 2½ hours at a bath temperature of 120° C. and then for 2 hours at 140° C.

Resin 2

The same procedure was carried out as for resin 1, except that only 5 g of water were used to dissolve the sodium hydroxide.

Resin 3

The same procedure was carried out as for resin 2, except that during the 2½ hour heating at 120° C. nitrogen was passed through the resin to assist the distillation.

The properties of the three resins are given in Table 1.

Five rubber blends were then made up using the three resins. The first three blends were made up according to composition 1 below, each blend including one of the three resins respectively. The fourth and fifth blends were made up according to composition 2 below, and included resin 2 and resin 3 respectively.

| Rubber Blend Compositions | 1 | 2 |
|---|---|---|
| Nitrile Rubber (37% acrylonitrile) | 100 | |
| Styrene-Butadiene Rubber (Intol 1500) | | 50 |
| Natural Rubber (SMR 10 Heveacramb) | 50 | |
| Carbon Black (Philblack 6) | | 25 |
| Resin | 50 | 40 |
| Zinc Oxide | 5 | 5 |
| Stearic Acid | 1.5 | 1 |
| Ancamine D | 2.5 | — |
| Ancamine CBS | — | 0.85 |
| Dibenzthiazyl Disulphide | 1.5 | — |
| Hexamine | 4.9 | 4 |
| Sulphur | 1.5 | 2.5 |

Also control blends were made according to either composition 1 or 2, but in which no Ancamine* D, Hexamine or Resin was incorporated.

In making all the blends the constituents were blended on a 2-roll mill, the rolls being at a temperature of about 50°-90° C. The rubber was banded on the mill and the resin added to the nip of the mill and blended by cutting the rubber with a knife and folding the rubber back on itself. The cutting and folding was carried out about ten times to ensure that blending was efficient. Then all the additives, apart from the hexamine and the sulphur, were similarly added using the cutting and folding process. Finally the hexamine and the sulphur were added and the cutting and folding process was continued until the blending was complete.

Each blend was then cross-linked by heating at 150° C. in a hydraulic press under a pressure of up to $80\times10^6$ N/m$^2$, for a time in excess of ten minutes. The properties of the cross-linked blends were then determined and are recorded in Table 2, which also shows for comparison the properties of unreinforced vulcanised rubber and vulcanised rubbers reinforced using commercial rubber-reinforcing resins.

Table 1

Properties of Carbazole-Formaldehyde-Phenol Resins

| Resin No. | Softening Point (°C.) | Free Carbazole Content (%) | Oxygen Content (%) | Free Phenol Content (%) | Nitrogen Content (%) | Colour |
|---|---|---|---|---|---|---|
| 1 | 90 | 7.4 | 11.4 | 9.5 | — | Blue-Green |
| 2 | 95.5 | 1.0 | 10.7 | 7.4 | 3.1 | Brown-Green |
| 3 | 111 | 5.1 | 10.2 | 5.6 | 3.3 | Brown |

Table 2.

Preparation and Properties of Rubber Vulcanizates, which are either Unreinforced, or reinforced by conventional resins or according to the present invention

| Blend | Composition | Rubber | Resin | Cure Time (Mins) | Hardness (IRHD°) | Tear Strength (Nmm$^{-1}$) | 100% Modulus (Nmm$^{-2}$) | 200% Modulus (Nmm$^{-2}$) | 300% Modulus (Nmm$^{-2}$) | UTS (Nmm$^{-2}$) | Elongation at UTS % |
|---|---|---|---|---|---|---|---|---|---|---|---|
| — | 1+ | NR | None | 40 | 50.5 | 12.0 | 0.8 | 0.5 | 0.5 | 1.5 | 473.0 |
| 1 | 1 | NR | 1 | 40 | 97.0 | 81.1 | 11.8 | 8.0 | — | 17.7 | 226.3 |
| 1 | 1 | NR | 1 | 10 | 96.3 | 80.3 | 11.2 | 7.6 | — | 19.4 | 276.0 |
| 2 | 1 | NR | 2 | 40 | 97.2 | 85.1 | 10.5 | 7.3 | — | 18.4 | 268.0 |
| 2 | 1 | NR | 2 | 20 | 96.5 | 88.8 | 9.5 | 6.6 | — | 16.4 | 265.0 |
| 3 | 1 | NR | 3 | 40 | 97.1 | 78.9 | 10.5 | 7.7 | 7.5 | 21.5 | 302.7 |
| 3 | 1 | NR | 3 | 20 | 96.3 | 81.7 | 10.6 | 7.5 | 6.9 | 21.4 | 307.3 |
| — | — | NR | Cellobond | 40 | 95 | 62 | 8.6 | 5.8 | 5.3 | 16.9 | 325 |
| — | — | NR | H.859[1] | 20 | 95 | 68 | 7.8 | 5.2 | 4.6 | 17.1 | 385 |
| — | 2+ | SBN | None | 15 | 53.7 | 29.1 | 1.3 | 1.8 | 2.4 | 15.0 | 435.0 |
| — | 2+ | SBN | None | 25 | 53.5 | 19.8 | 1.6 | 1.8 | 2.5 | 12.4 | 376.0 |
| 4 | 2 | SBN | 2 | 15 | 70.5 | 29.9 | 4.3 | 4.6 | — | 10.1 | 227.0 |
| 4 | 2 | SBN | 2 | 25 | 71.6 | 21.0 | 5.1 | 5.0 | — | 9.8 | 188.6 |
| 4 | 2 | SBN | 2 | 25 | 70.4 | 26.0 | 5.2 | 5.1 | — | 10.7 | 213.0 |
| 5 | 2 | SBN | 3 | 15 | 74.3 | 21.1 | 2.3 | 2.2 | 2.6 | 7.0 | 287.3 |
| 5 | 2 | SBN | 3 | 25 | 75.2 | 22.7 | 2.6 | 2.1 | — | 4.4 | 200.0 |
| — | — | SBN | Synphorm | 25 | 81 | 64 | N.D. | N.D. | — | 13 | 230 |

Table 2.-continued

Preparation and Properties of Rubber Vulcanizates, which are either Unreinforced, or reinforced by conventional resins or according to the present invention

| Blend | Composition | Rubber | Resin | Cure Time (Mins) | Hardness (IRHD°) | Tear Strength ($Nmm^{-1}$) | 100% Modulus ($Nmm^{-2}$) | 200% Modulus ($Nmm^{-2}$) | 300% Modulus ($Nmm^{-2}$) | UTS ($Nmm^{-2}$) | Elongation at UTS % |
|---|---|---|---|---|---|---|---|---|---|---|---|
| — | — | SBN | R.3201[2] | 15 | 78 | 74 | N.D. | N.D. | — | 12 | 280 |

NR = Nitrile Rubber
SBN = Styrene/Butadiene and Natural Rubber
* Without Resin, hexamine or Ancamine D
UTS = Ultimate Tensile Strength
IRHD° = International Rubber Hardness, Degrees.
[1]50 parts per hundred of rubber used.
[2]40 parts per hundred of rubber used.

It can be seen from the data presented in Table 2 that by carrying out the method of the present invention, that is by reinforcing rubber with a carbazole resin, a highly reinforced rubber is produced. The enhancement of the modulus, hardness and other properties of rubber by reinforcement with a carbazole resin when compared to enhancement of these properties of rubber reinforced with commercially developed and used resins is quite unexpected and represents a significant advance in the field of rubber reinforcement.

We claim:

1. A method of making a reinforced rubber comprising cross-linking a blend of
   (i) 100 parts of a rubber selected from the group consisting of styrene/butadiene rubber, nitrile rubber, natural rubber and a blend of at least two of them;
   (ii) from 5 to 150 parts of a carbazole/phenol/formaldehyde resin made according to a procedure comprising the steps of:
   (a) refluxing a mixture of carbazole, a monocyclic phenol and aqueous formaldehyde under alkaline conditions for from 3 to 15 minutes, the molar ratio of carbazole to phenol being from 1:2 to 1:5 and of carbazole+phenol to formaldehyde being from 2:1 to 1:1,
   (b) bringing the mixture to a pH of from 1 to 2 by the addition of acid; and
   (c) maintaining the acidified mixture at a pH from 1 to 2 and at a temperature of about 100° C. for from 1 to 5 hours;
   (iii) from 1 to 5 parts of a vulcanising agent for the rubber; and
   (iv) from 5 to 15 parts per hundred parts of the resin of a formaldehyde donor.

2. A method according to claim 1, in which the cross linking is achieved by heating the blend at a temperature of from 120° to 180° C. under pressure of from $4\times10^6$ to 80 $N/m^2$ for at least ten minutes.

3. A method according to claim 1, in which the acid added in step (b) is oxalic acid.

4. A method according to claim 1, in which the blend includes an accelerator.

5. A method according to claim 1, in which the formaldehyde donor is Hexamine.

6. A method according to claim 1, in which the blending is carried out at a temperature of from 50° to 90° C.

7. Reinforced rubber when made according to the method of claim 1.

* * * * *